United States Patent [19] [11] 3,863,324
Ehrhardt [45] Feb. 4, 1975

[54] METHOD FOR FORMING AN EDGE-SUPPORTED ANNULAR MAGNETIC RECORDING MEDIUM

[75] Inventor: Robert A. Ehrhardt, New Providence, N.J.

[73] Assignee: Bell Telephone Laboratories, Incorporated, New York, N.Y.

[22] Filed: June 24, 1954

[21] Appl. No.: 439,080

[52] U.S. Cl. ........................ 29/423, 29/527.4, 204/9, 148/4
[51] Int. Cl. ........................ B23p 17/00
[58] Field of Search .......... 29/529, 423, 460, 527.3, 29/527.4; 204/9, 16; 22/196

[56] References Cited

UNITED STATES PATENTS

| | | | |
|---|---|---|---|
| 1,958,468 | 5/1934 | Christie | 29/527.3 |
| 2,074,007 | 3/1937 | Wissler | 148/4 |
| 2,181,256 | 11/1939 | Arbogast | 204/9 |
| 2,514,428 | 7/1950 | Varian | 29/423 |

*Primary Examiner*—Samuel Feinberg
*Attorney, Agent, or Firm*—J. F. McEneany

EXEMPLARY CLAIM

1. In a recording and reproducing apparatus employing a magnetizable tape secured at one marginal edge thereof to the peripheral surface of a circular member of nonmagnetic material, the method of forming said magnetizable tape on said circular member which comprises attaching to a lateral face of said circular member a ring of metal, machining the peripheral surfaces of said circular member and said attached metal ring in a single operation to form coextensive peripheral surface areas, applying a plating of magnetizable material to the peripheral surface areas of said member and of said ring and thereafter removing said metal ring to leave a width of magnetizable material attached to and overhanging one edge of said circular member.

6 Claims, 7 Drawing Figures

PATENTED FEB 4 1975

3,863,324

Figure 1:
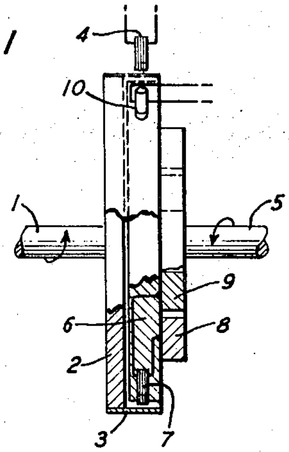

INVENTOR
R. A. EHRHARDT
BY
J. F. McEneany
ATTORNEY

METHOD FOR FORMING AN EDGE-SUPPORTED ANNULAR MAGNETIC RECORDING MEDIUM

This invention relates to a magnetic bifacial recorder-multiplier and particularly to a method for forming a thin magnetizable tape with one marginal edge attached to and overhanging one lateral surface of a rotatable element of said recorder-multiplier.

In a bifacial recorder-multiplier, a thin magnetic recording tape is attached at one marginal edge to and overhangs one lateral surface of a circular member which is rotated by a constant speed driving means. A magnetic head associated with one surface of the magnetic tape records signals thereon. A reproducing head associated with the opposite surface of the magnetic tape reproduces the recorded signals. The reproducing head is mounted in the peripheral face of a second circular member which is rotated by a separate constant speed driving means. As the recording and reproducing scanning operations take place on opposite surfaces of the magnetic tape, they can be carried on simultaneously at different speeds. By rotating the circular member supporting the reproducing head at a speed higher than the speed of the circular member supporting the magnetic recording tape, a desired frequency multiplication can be obtained.

In recording and reproducing apparatus of the type described, the magnetic heads are each separated from the magnetic tape by about 0.002 inches. Because of this out-of-contact relation between magnetic head and magnetic tape, there is some loss at short wavelengths of the recorded and reproduced sounds. An additional loss is introduced in reproduction because of the fact that the reproduced scanning takes place on the surface of the magnetic tape opposite the surface on which the recording was made. Since the reproducing field strength of the recording diminishes with increasing distance between the record and the reproducing air gap in the reproducing magnetic head, it is evident that, because of the thickness of the magnetic tape, a loss in reproduced sound level will result. Signal loss caused by the thickness of the magnetizable medium has been considerably minimized by using a recording medium which is as thin as is mechanically practicable.

While a suitably thin magnetizable medium is obtainable by known methods, it is extremely difficult to satisfactorily secure this thin recording medium to a circular supporting member without producing eccentricities in the overhanging portion of the recording medium. To obtain satisfactory recording and reproduction, it is necessary that the overhanging portion of the tape be normal to the lateral surface of its supporting disc at all points throughout its length.

It is the object of this invention to provide a method for satisfactorily securing a thin magnetizable band or tape to a circular supporting element of a recorder-multipler with the magnetizable band overhanging one lateral surface of the supporting element.

The method in accordance with this invention comprises attaching a metallic ring to one lateral surface of the circular support, the ring having an external diameter substantially equal to the external diameter of the supporting member; machining the periphery of the supporting member and the ring in a single operation to the same external diameter, applying a uniform layer of magnetic plating across the periphery of the supporting member and the metal ring and finally, melting out or chemically removing the metal ring to thus leave a desired width of overhanging magnetizable plating attached to the supporting member along one marginal edge of the plating.

The invention will be more clearly understood from the following specification when read in connection with the drawings in which:

FIG. 1 shows that portion of a magnetic recorder-multiplier which includes the rotatable magnetic medium and the recording and reproducing magnetic heads, and FIGS. 2 to 7, inclusive, show successive steps in the method of securing the magnetic recording material to a rotatable supporting element of a recorder-multiplier.

Referring to FIG. 1, a recorder-multiplier includes shaft 1 which is driven by motor means in the direction indicated by an arrow at a predetermined constant angular speed. A circular element or disc 2, attached to shaft 1, has secured to the periphery thereof a thin band of magnetic material 3. The magnetic band 3 overhangs one lateral surface of disc 2. A recording magnetic head 4 receives signals to be recorded and records these signals on the outer surface of the overhanging portion of the magnetic material 3. An erase magnetic head 10 is operable in the area of the recorded signal on the medium to erase existing signals on the tape prior to the recording of new signals thereon. A shaft 5 has mounted thereon a rotatable disc 6 in the periphery of which is mounted a reproducing magnetic head 7. The magnetic head 7 reproduces the recorded signals from the opposite surface of the magnetic material 3. Electrical currents representing the reproduced signals are taken off through capacity slip rings 8 and 9.

The shaft 5 and the disc 6 are rotated in a direction opposite to the direction of rotation of the shaft 1 and disc 2. The disc 6 is rotated at a higher speed than is the disc 2 whereby a multiplication of the frequency of the recorded signal is obtained. For example, with an angular speed of disc 2 of 16.9 revolutions per minute and a recorded frequency range of 5 to 150 cycles per second, a reproduced frequency range of 1,000 to 32,000 cycles per second can be obtained by rotating disc 6 at an angular speed of 3,600 revolutions per minute. A recorder-multiplier of the type described is useful in recording sounds containing small periodic signals of interest, which record is then scanned repeatedly at higher speed to permit search for the periodic signals by spectral analysis.

The recording head 4 and the reproducing head 7 are each located a predetermined distance from the surface of the recording medium 3. This separation, in each case in the recorder-multiplier as shown, is in the order of 0.002 inch and it is highly important for efficient operation of the recorder-multiplier that this distance does not vary during rotation of the magnetic medium 3 past the magnetic heads 4 and 7. It is extremely important, therefore, that the overhanging portion of the thin magnetic medium form a perfect circle about the center of disc 2, that is, that the medium be normal to the lateral surface of its supporting disc at every point along its length.

While a magnetic medium of the required uniform thinness can be obtained by known methods, it has been found extremely difficult to secure a thin flat magnetic medium so obtained to the supporting rotatable disc by known methods without producing undulations and other eccentricities in the recording medium which will produce serious deleterious effects in the recording and reproduction of the desired signals.

In accordance with this invention, applicant provides a method for successfully accomplishing the joining of the recording medium to its supporting disc, which method will be described in connection with FIGS. 2 to 7, inclusive.

Figure 2:
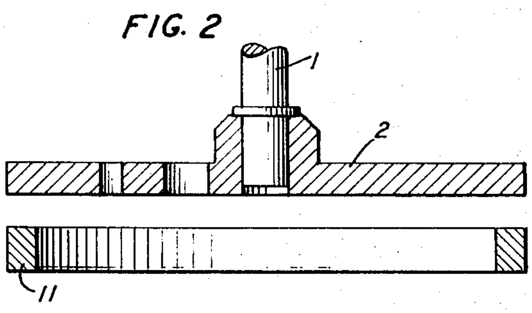
Figure 3:
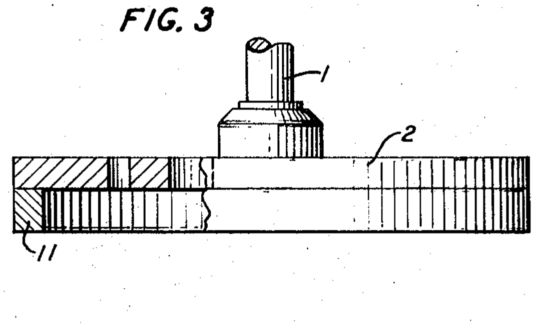

Referring to FIG. 2, the shaft 1 is shown with disc 2 attached thereto. In the preferred form, shaft 1 is made of stainless steel and the disc 2 is made of brass. A metal ring 11 is soldered to the disc 2, as shown in FIG. 3. In the preferred form, this metal ring is made of copper for the reason that copper and brass have not too great a difference in their coefficients of expansion, they are readily solderable and machine well. The copper ring 11 may be retained in its original form as shown in FIG. 3 or it may be machined to remove as much copper as is practical (as shown in FIG. 4) in order to minimize the amount of copper to be removed later by chemical means.

Figure 4:
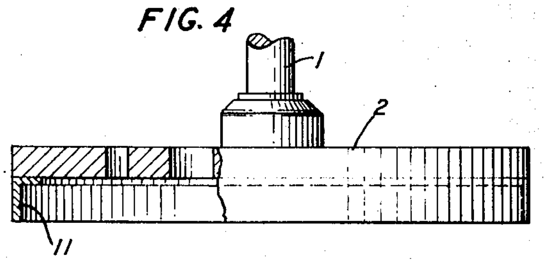
Figure 5:
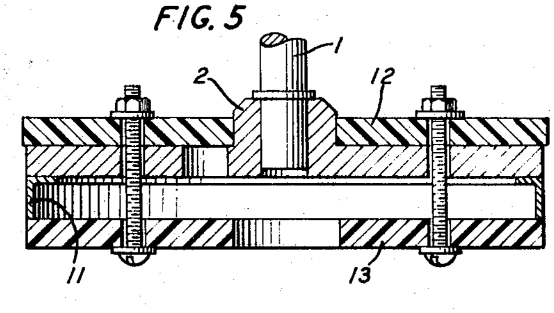

The unit as shown in either FIG. 3 or FIG. 4 is then subjected to a machining operation in which the periphery of disc 2 and the periphery of ring 11 are accurately machined to the same external diameter in a single operation. FIG. 5 discloses the unit of FIG. 4 as clamped between suitable plastic discs 12 and 13. If the copper ring 11 is machined to remove excess metal as explained above, the clamps 12 and 13 are added prior to the machining operation on the peripheral surface of the elements 2 and 11 as these plastic discs aid in the machining of the copper by supporting the thin edge of the ring 11.

Figure 6:
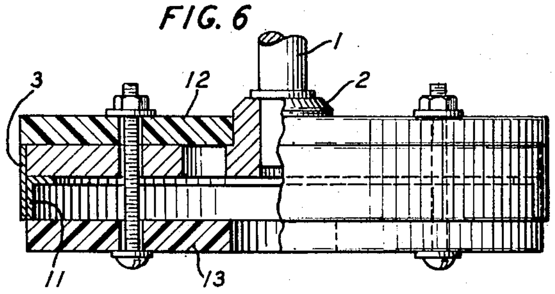
Figure 7:
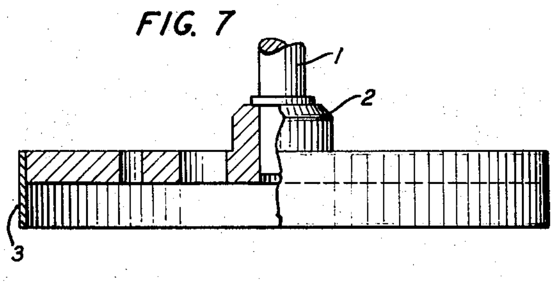

Following the machining operation, the magnetic material 3 is electroplated on the outer surface of the copper ring 11 and the brass disc 2, as shown in FIG. 6. An electroplating operation well known in the art is employed to deposit a suitable nickel-cobalt plating of uniform thickness over the peripheral surfaces of the ring and disc. The plastic disc 13 acts as a mask during the electroplating operation to prevent deposit of the electroplated material on the inner surface of the copper ring 11.

Following the electroplating operation, the plastic discs 12 and 13 are removed and the unit, including shaft 1, disc 2, plating 3 and ring 11, is immersed in a bath of sodium polysulfide for approximately 10 minutes. The polysulfide is maintained at a temperature of approximately 180° F. The resulting chemical reaction converts the copper ring to poorly adherent copper sulfide which is then removed completed by immersion of the unit into a solution of sodium cyanide for a period of from 30 seconds to 1 minute. This processing is repeated until the copper is completely removed. To hasten the removal of the poorly adherent copper sulfide and to effect economy in the use of sodium cyanide, the copper sulfide may be partially removed before immersion into the bath of sodium cyanide by the use of a jet of water.

Upon removal of the copper ring by the steps described above, there is provided a unit as shown in FIG. 7 in which the magnetic recording material 3 of uniform thickness at one marginal edge to the rotatable support 2 and overhangs one lateral surface of this rotatable support, the overhanging portion being free of eccentricities likely to interfere with a satisfactory recording and reproduction of sounds in a recorder-multiplier as shown in FIG. 1.

Applicant has described the method in accordance with this invention of producing the result desired and in his description has described the preferred use of a copper ring which is subsequently dissolved out by conversion of the copper to copper sulfide and solution of the sulfide in sodium cyanide. It is to be understood, however, that other materials may be employed and a satisfactory result obtained. For example, low melting alloys, such as lead or tin bismuth, may be employed in place of the copper ring 11 in the method described and this material may be melted out in a hot oil bath. Also, aluminum may be employed in place of the copper ring 11 and this material may be subsequently dissolved out by alkali solutions.

Applicant, therefore, provides a novel and extremely useful method for securing a thin magnetizable medium to a circular rotatable supporting element for use in a bifacial recorder-multiplier.

What is claimed is:

1. In a recording and reproducing apparatus employing a magnetizable tape secured at one marginal edge thereof to the peripheral surface of a circular member of nonmagnetic material, the method of forming said magnetizable tape on said circular member which comprises attaching to a lateral face of said circular member a ring of metal, machining the peripheral surfaces of said circular member and said attached metal ring in a single operation to form coextensive peripheral surface areas, applying a plating of magnetizable material to the peripheral surface areas of said member and of said ring and thereafter removing said metal ring to leave a width of magnetizable material attached to and overhanging one edge of said circular member.

2. In a recording and reproducing apparatus employing a magnetizable tape secured at one marginal edge thereof to the peripheral surface of a circular member of nonmagnetic material, the method of forming said magnetizable tape on said circular member which comprises attaching to said circular member a ring of metal capable of being dissolved by a reagent which does not significantly attack the metal of said circular member or of said tape, machining the peripheral surfaces of said circular member and of said metal ring in a single operation to produce coextensive peripheral surfaces, applying a plating of magnetizable material to the peripheral surfaces of said circular member and of said ring and thereafter removing said metal ring by the application of a reagent capable of dissolving the metal of said ring to leave a width of magnetizable material attached at one marginal edge thereof to and overhanging one edge of said circular member.

3. In a recording and reproducing apparatus employing a magnetizable tape secured at one marginal edge thereof to the peripheral surface of a circular member of nonmagnetic material, the method of forming said annular magnetizable tape on said circular member which comprises attaching a ring of copper to a lateral face of said circular member, machining the peripheral surfaces of said member and of said copper ring in a single operation to produce coextensive peripheral surfaces, applying a plating of magnetizable material to the peripheral surface areas of said circular member and of said copper ring, immersing the unit comprising said circular member, said copper ring and said plating in a bath of sodium polysulfide, and thereafter removing the resulting copper sulfide by immersion of said unit into a solution of sodium cyanide.

4. In a recording and reproducing apparatus employing a magnetizable tape secured at one marginal edge thereof to the peripheral surface of a circular member of nonmagnetic material, the method of forming said magnetizable tape on said circular member which comprises attaching a ring of copper to a lateral face of said circular member, machining the peripheral surfaces of said member and of said copper ring in a single operation to produce coextensive peripheral surfaces, applying a plating of magnetizable material to the peripheral surface areas of said circular member and of said copper ring, subjecting the unit comprising said circular member, said copper ring and said plating to immersion in a bath of sodium polysulfide maintained at a temperature of not less than 180° F. for a period not exceeding 10 minutes, thereafter immersing said unit in a bath of a solution of sodium cyanide for a period not exceeding 1 minute and repeating said steps until said copper ring is completely removed to thus leave a unit comprising said magnetizable plating attached to the peripheral surface of said circular member and overhanging one edge thereof.

5. In a recording and reproducing apparatus employing a magnetizable tape secured at one marginal edge thereof to the peripheral surface of a circular member of nonmagnetic material, the method of forming said magnetizable tape on said circular member which comprises attaching a ring of low melting alloy to one lateral surface of said circular member, machining the peripheral surfaces of said member and said ring in a single operation to form coextensive peripheral surface areas, applying a plating of magnetizable material to the peripheral surface areas of said circular member and of said ring and thereafter immersing the unit comprising said circular member, said ring and said plating into a bath of heated oil whereby said low melting alloy is removed from said unit to leave a unit comprising said magnetizable material attached at one marginal edge to and overhanging one lateral face of said circular member.

6. In a recording and reproducing apparatus employing a magnetizable tape secured at one marginal edge thereof to the peripheral surface of a circular member of nonmagnetic material, the method of forming said annular magnetizable tape on said circular member which comprises attaching to a lateral face of said rotatable member a ring of aluminum, machining the peripheral surfaces of said circular member and said attached aluminum ring in a single operation to form coextensive peripheral surface areas, applying a plating of magnetizable material to the peripheral surface areas of said member and of said ring and thereafter immersing the unit comprising said circular member, said aluminum ring and said plating in a bath of alkali solutions whereby said aluminum ring is dissolved to thereby leave a unit comprising said magnetizable material attached at one marginal edge to and overhanging one lateral face of said circular member.

* * * * *